United States Patent
Rabinowitz (10) Patent No.: US 7,568,479 B2
(45) Date of Patent: Aug. 4, 2009

(54) FRESNEL SOLAR CONCENTRATOR WITH INTERNAL-SWIVEL AND SUSPENDED SWIVEL MIRRORS

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 0 days.

(21) Appl. No.: 11/963,686

(22) Filed: Dec. 21, 2007

(65) Prior Publication Data

US 2009/0159074 A1    Jun. 25, 2009

(51) Int. Cl.
*F24J 2/38* (2006.01)
*G02B 5/08* (2006.01)
*G02B 7/182* (2006.01)

(52) U.S. Cl. .................. 126/600; 126/601; 359/850; 359/851

(58) Field of Classification Search ............. 126/600, 126/601; 359/290, 296, 849, 850, 851
See application file for complete search history.

(56) References Cited

U.S. PATENT DOCUMENTS

| | | | | |
|---|---|---|---|---|
| 683,088 | A * | 9/1901 | Wideen | 126/603 |
| 1,882,648 | A * | 10/1932 | Kanolt | 396/331 |
| 3,797,476 | A * | 3/1974 | Tarcici | 126/600 |
| 3,872,854 | A * | 3/1975 | Raser | 126/606 |
| 3,998,206 | A * | 12/1976 | Jahn | 126/578 |
| 4,102,326 | A * | 7/1978 | Sommer | 126/575 |
| 4,111,184 | A * | 9/1978 | Fletcher et al. | 126/577 |
| 4,114,594 | A * | 9/1978 | Meyer | 126/606 |
| 4,130,109 | A * | 12/1978 | Brueck | 126/685 |
| 4,209,222 | A * | 6/1980 | Posnansky | 359/359 |
| 4,210,847 | A * | 7/1980 | Shannon et al. | 315/111.91 |
| 4,249,511 | A * | 2/1981 | Krisst et al. | 126/608 |
| 4,312,326 | A * | 1/1982 | Johnson, Jr. | 126/606 |
| 4,315,500 | A * | 2/1982 | Gonder | 126/567 |
| 4,361,295 | A * | 11/1982 | Wenzel | 244/33 |
| 4,466,423 | A * | 8/1984 | Dolan et al. | 126/571 |
| 4,968,355 | A | 11/1990 | Johnson | |
| 5,058,565 | A * | 10/1991 | Gee et al. | 126/570 |
| 5,997,147 | A * | 12/1999 | Tatoian | 359/856 |
| 6,197,228 | B1 * | 3/2001 | Sheridan | 264/1.36 |
| 6,204,946 | B1 * | 3/2001 | Aksyuk et al. | 398/9 |
| 6,211,998 | B1 * | 4/2001 | Sheridan | 359/296 |
| 6,237,241 | B1 * | 5/2001 | Aaron et al. | 33/613 |
| 6,262,707 | B1 * | 7/2001 | Sheridan | 345/111 |
| 6,354,725 | B1 * | 3/2002 | Simon | 362/576 |
| 6,542,283 | B1 * | 4/2003 | Sheridan | 359/296 |
| 6,698,693 | B2 | 3/2004 | Davidson et al. | |
| 6,957,894 | B2 | 10/2005 | Rabinowitz et al. | |

(Continued)

*Primary Examiner*—Kenneth B Rinehart
*Assistant Examiner*—Jorge Pereiro (57) ABSTRACT

This invention deals with novel method and apparatus for positioning and motion control of the elements (mirrors) of a Fresnel reflector solar concentrator tracking heliostat array wherein the elements are suspended with the center of mass below the swivel point, or have an internal-swivel. This achieves an advantageous natural vertical stability. The torque to produce angular deflection, and rotational motion is provided separately by an electric wind force due to electrons, ions, and/or neutrals; or in combination with an induced and/or permanent dipole coupling to an electronic grid. Thus forces and torques are produced without the use of internal moving parts such as in motors. The instant invention exceeds the capability of conventional systems. It is ideally suited for maximization of solar energy focused by a low-profile concentrator array onto a receiver. Since there are no internal moving parts, the instant invention provides less costly and greater ease of manufacture. Dynamic motion can be controlled over a wide range of dimensions from nanometers to decimeters.

18 Claims, 7 Drawing Sheets

U.S. PATENT DOCUMENTS

| | | | |
|---|---|---|---|
| 6,959,993 B2 | 11/2005 | Gross et al. | |
| 6,964,486 B2 * | 11/2005 | Rabinowitz | 359/851 |
| 6,975,445 B1 | 12/2005 | Rabinowitz | |
| 6,988,809 B2 | 1/2006 | Rabinowitz | |
| 7,077,361 B1 * | 7/2006 | Rabinowitz | 244/172.8 |
| 7,115,881 B2 * | 10/2006 | Rabinowitz et al. | 250/423 R |
| 7,130,102 B2 * | 10/2006 | Rabinowitz | 359/290 |
| 7,133,183 B2 * | 11/2006 | Rabinowitz | 359/290 |
| 7,156,088 B2 | 1/2007 | Luconi | |
| 7,187,490 B2 | 3/2007 | Rabinowitz | |
| 7,192,146 B2 | 3/2007 | Gross et al. | |
| 7,247,790 B2 | 7/2007 | Rabinowitz | |
| 2004/0161332 A1 * | 8/2004 | Rabinowitz et al. | 415/80 |
| 2005/0034750 A1 * | 2/2005 | Rabinowitz | 136/243 |
| 2006/0150968 A1 * | 7/2006 | Rabinowitz | 126/714 |

* cited by examiner

FRESNEL SOLAR CONCENTRATOR WITH INTERNAL-SWIVEL AND SUSPENDED SWIVEL MIRRORS

FIELD OF THE INVENTION

The instant invention relates generally to a Solar Energy Fresnel Reflector Concentrator array that tracks the sun and focuses the reflected light by means of an Electric Wind Force and/or Induced Dipole Alignment of swiveled inverted mirrors that are suspended from their swivel. The mirrors are suspended from a universal swivel that can rotate or tilt in any direction.

BACKGROUND OF THE INVENTION

This invention provides a better means to achieve affordable solar energy than by a conventional tracking heliostat array. In the latter, enabling the optical elements (mirrors) to be movable generally requires many large heavy motors that consume a great deal of power. This results in an expensive, bulky, and ponderous heliostat that is unfavorable for rooftop and other applications where much weight cannot be tolerated. The present invention functions in solar concentrators and similar equipment much the same as parabolic dish and parabolic trough concentrators, without their disadvantages of bulk and weight. The angular alignment of the optical elements (mirrors, refractors, lenses, etc.) is accomplished by an Electric Wind force and/or Induced Dipole Alignment of swiveled mirrors rather than with cumbersome motors. The many manifestations of the Electric Wind force are described and taught in detail in U.S. Pat. No. 7,115,881, "Positioning and Motion Control by Electrons, Ions, and Neutrals in Electric Fields by Mario Rabinowitz, issued on Oct. 3, 2006. Induced dipole alignment of rotatable mirrors is described and taught in detail in U.S. Pat. No. 6,964,486, "Alignment of Solar Concentrator Micro-Mirrors" by Mario Rabinowitz, issued on Nov. 15, 2005; and U.S. Pat. No. 7,187,490, "Induced Dipole Alignment Of Solar Concentrator Balls" by Mario Rabinowitz, issued on Mar. 6, 2007. As described in these patents, the electric dipole can be induced in the metallic conducting part of the mirror and/or the dielectric part of the mirror.

DESCRIPTION OF THE PRIOR ART

No prior art was found related to Electric Wind Force and/or Induced Dipole Alignment of swiveled inverted mirrors that are suspended from their overhead swivel serving as reflecting elements in a Fresnel reflector solar concentrator. The prior art has investigated mirrored ball alignment where the balls are in concentric cavities; mirrored ball alignment where the balls are between two egg crate like sheets; and pivoting below the mirrors. No prior art was found that utilized induced dipole alignment in electric fields of swiveled mirrors that are vertically stable in a Fresnel reflector solar concentrator, optical switches, displays, or other similar equipment. Nor was any prior art found that utilized the internal-swivel ability of the instant invention to rotate planar mirror disks and similar configurations in place without the need for an affixed or suspended swivel. Furthermore, the instant invention can be operated without need of containment by concentric cavities or an egg crate structure. Furthermore, the swiveled structure of the instant invention permits operation with minimal confinement, and if desired can operate in air. Having the swivel point above the mirrors has the additional advantage of vertical stability because the center of mass is below the swivel suspension point. Vertical stability provides a natural fiducial or starting point, as well as enabling simpler and more efficient alignment.

INCORPORATION BY REFERENCE

In a solar energy application (as well as other functions), adjustable reflecting elements are an important feature of a Fresnel reflector solar concentrator which tracks the sun and directs the sunlight to a receiver as described in the following patents and published papers. The following U.S. patents, and Solar Journal publication are fully incorporated herein by reference.

1. U.S. Pat. No. 7,247,790 by Mario Rabinowitz, "Spinning Concentrator Enhanced Solar Energy Alternating Current Production" issued on Jul. 24, 2007.

2. U.S. Pat. No. 7,187,490 by Mario Rabinowitz, "Induced Dipole Alignment Of Solar Concentrator Balls" issued on Mar. 6, 2007

3. U.S. Pat. No. 7,133,183 by Mario Rabinowitz, "Micro-Optics Solar Energy Concentrator" issued on Nov. 7, 2006.

4. U.S. Pat. No. 7,130,102 by Mario Rabinowitz, "Dynamic Reflection, Illumination, and Projection" issued on Oct. 31, 2006.

5. U.S. Pat. No. 7,115,881 by Mario Rabinowitz and Mark Davidson, "Positioning and Motion Control by Electrons, Ions, and Neutrals in Electric Fields" issued on Oct. 3, 2006.

6. U.S. Pat. No. 7,112,253, by Mario Rabinowitz, "Manufacturing Transparent Mirrored Mini-Balls for Solar Energy Concentration and Analogous Applications" issued on Sep. 26, 2006.

7. U.S. Pat. No. 7,077,361, by Mario Rabinowitz, "Micro-Optics Concentrator for Solar Power Satellites" issued on Jul. 18, 2006.

8. U.S. Pat. No. 6,988,809 by Mario Rabinowitz, "Advanced Micro-Optics Solar Energy Collection System" issued on Jan. 24, 2006.

9. U.S. Pat. No. 6,987,604 by Mario Rabinowitz and David Overhauser, "Manufacture of and Apparatus for Nearly Frictionless Operation of a Rotatable Array of Micro-Mirrors in a Solar Concentrator Sheet" issued on Jan. 17, 2006.

10. U.S. Pat. No. 6,975,445 by Mario Rabinowitz, "Dynamic Optical Switching Ensemble" issued on Dec. 13, 2005.

11. U.S. Pat. No. 6,964,486 by Mario Rabinowitz, "Alignment of Solar Concentrator Micro-Mirrors" issued on Nov. 15, 2005.

12. U.S. Pat. No. 6,957,894 by Mario Rabinowitz and Felipe Garcia, "Group Alignment Of Solar Concentrator Micro-Mirrors" issued on Oct. 25, 2005.

13. U.S. Pat. No. 6,843,573 by Mario Rabinowitz and Mark Davidson, "Mini-Optics Solar Energy Concentrator" issued on Jan. 18, 2005.

14. U.S. Pat. No. 6,738,176 by Mario Rabinowitz and Mark Davidson, "Dynamic Multi-Wavelength Switching Ensemble" issued on May 18, 2004.

15. U.S. Pat. No. 6,698,693 by Mark Davidson and Mario Rabinowitz, "Solar Propulsion Assist" issued on Mar. 2, 2004.

16. U.S. Pat. No. 6,612,705 by Mark Davidson and Mario Rabinowitz, "Mini-Optics Solar Energy Concentrator" issued on Sep. 2, 2003.

17. Solar Energy Journal, Vol. 77, Issue #1, 3-13 (2004) "Electronic film with embedded micro-mirrors for solar energy concentrator systems" by Mario Rabinowitz and Mark Davidson.

DEFINITIONS

"Adjustable Fresnel reflector" is a variable focusing planar reflecting surface much like a planar Fresnel lens is a focusing transmitting surface. Heuristically, it can somewhat be thought of as the projection of thin variable-angular segments of small portions of a thick focusing mirror upon a planar surface whose angles can be adjusted with respect to the planar surface.

"Concentrator" as used herein in general is an adjustable array of mirrors for focusing and reflecting light. In a solar energy context, it is that part of a Solar Collector system that directs and concentrates solar radiation onto a solar Receiver.

"Dielectric" refers to an insulating material in which an electric field can be sustained with a minimum power dissipation.

"Double Back-To-Back Mirrors" herein shall mean a pair of flat or slightly concave mirrors (in an array of such mirror pairs) that are joined together about a swivel axis so that when the top mirror becomes occluded, the pair can be rotated 180 degrees thus exposing the clean mirror for further usage.

"Electric dipole" refers to the polarization of negative and positive charge. This may be permanent as with electrets, or induced.

"Electric field" or "electric stress" refers to a voltage gradient. An electric field can produce a force on charged objects, as well as neutral objects. The force on neutral objects results from an interaction of the electric field on intrinisic or induced electric polar moments in the object.

"Electric wind" herein shall mean the force due to electrons, ions, and neutrals in electric fields resulting in actuation, motion production, control, and positioning. Such force can be produced by field emission, corona discharge, Schottky emission, thermionic emission, negative and positive ion emission, or any combination thereof.

"Electrical breakdown" occurs when a high enough voltage or electric field is applied to a dielectric (vacuum, gas, liquid, or solid) at which substantial electric charge is caused to move through the dielectric.

"Electret" refers to a solid dielectric possessing persistent electric polarization, by virtue of a long time constant for decay of charge separation.

"Enhanced or macroscopic electric field" is the electric field enhanced by whiskers very near the electrodes based upon the local (microscopic) geometry on the surface of the electrodes.

"Field emission or cold emission" is the release of electrons from the surface of a cathode (usually into vacuum) under the action of a high electrostatic field $\sim 10^7$ V/cm and higher. The high electric field sufficiently thins the potential energy barrier so that electrons can quantum mechanically tunnel through the barrier even though they do not have enough energy to go over the barrier. This is why it is also known as "cold emission" as the temperature of the emitter is not elevated.

"Focusing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Induced Electric dipole" refers to the polarization of negative and positive charge produced by the application of an electric field.

"Internal-swivel" herein means the ability to rotate in place without the need for an external affixed pivot or swivel. In the instant invention, planar mirror disks, etc. internal-swivel inside hollow concentric cavities when acted on by an external field to cause rotatation (e.g. to track the sun).

"Macroscopic electric field" is the applied electric field on the basis of the imposed voltage and the gross (macroscopic) geometry of the electrodes, and which is relevant as long as one is not too near the electrodes.

"Mean free path" of a particle is the average distance the particle travels between collisions in a medium. It is equal to [number density of the medium times the collision cross-section]$^{-1}$.

"Negative ion" is a neutral atom or molecule which has captured one or more electrons.

"Negative ion emission" as used herein is the induced emission of negative ions near an electron emitting cathode where low energy electrons are captured by electronegative molecules.

"Optical elements" are the mirrors, reflectors, focusers, etc. of a concentrator array. As a focuser the optical element may be a lens or include a lens.

"Pyramid or Pyramidal" as used herein refers to a solar collection system in the form of a large base (area) concentrator with three or more sides and a smaller area receiver above the base. In the limit the word Pyramid or Pyramidal includes a truncated cone. The base is a three-dimensional parabolic solar concentrator array that tracks the sun and focuses sunlight onto the receiver.

"Schottky emission" is the enhancement of thermionic emission from a cathode resulting from the application of a moderate accelerating electric field $\sim 10^5$ V/cm to $\sim 10^6$ V/cm. The electric field lowers the barrier height, and hence decreases the effective work function. The electric field is not high enough to sufficiently thin the barrier width, so that field emission is not an appreciable part of the emission at moderate electric fields.

"Thermionic emission" is the liberation of electrons from a heated electrical conductor. The electrons are essentially boiled out of a material when they obtain sufficient thermal energy to go over the potential energy barrier of the conductor. This is somewhat analogous to the removal of vapor from a heated liquid as in the boiling of water.

"Thermo-field assisted emission" involves thermionic emission in the presence of a moderate to high electric field so that it includes the realms of both Schottky emission and field emission. At high electric fields, the emission rate is much higher than just from Schottky emission as the barrier is not only decreased in height, but also in width.

"Trough" refers to a Fresnel two-dimensional parabolic trough solar concentrator array that tracks the sun and focuses sunlight onto a receiver.

"Swivel" is a pivot or universal joint permitting many degrees of freedom for rotation about the swivel point. As taught in the instant invention, a preferred embodiment is to have the mirrors suspended below the swivel.

"Torr" is a unit of pressure, where atmospheric pressure of 14.7 lb/in$^2$=760 Torr=760 mm of Hg.

"Receiver" as used herein in general such as a solar cell or heat engine system for receiving reflected light. In a solar energy context, it receives concentrated solar radiation from the adjustable mirror assembly for the conversion of solar energy into more conveniently usable energy such as electricity.

"Whisker" is the generic term used herein for a micro-protrusion or asperity on the surface of a material with a large aspect ratio of height to tip radius.

SUMMARY OF THE INVENTION

In the Electric Wind and Internal-swivel Induced Dipole Alignment Adjustable Fresnel Planar Mirror Solar Concentrators that have been developed, the rotatable optical elements (mirrors) can be aligned to concentrate solar energy on a receiver having dimensions small compared to the dimensions of the array. This permits the focal point of the array to remain focused on the receiver over the course of a day and throughout the year. The swivel point for rotation is located above the mirrors, giving the additional advantage of vertical stability. Vertical stability provides a natural fiducial or starting point, as well as enabling simpler and more efficient alignment. At startup for initial operation, or following a blackout, having the swivel point affixed above the mirrors gives them a natural quasi-vertical position since the center of mass of the mirrors is below the swivel suspension point. A given natural angle with respect to the vertical can be built in to the mirrors by weight distribution and/or constructing the mirrors with a cocked angle relative to their support stem. Such quasi-vertical positioning allows the mirrors to start from a nearly aligned position, rather than having to move over a much larger angle for alignment. Furthermore, the natural stability of a quasi-vertical position [as opposed to the natural stability of a quasi-horizontal position when the swivel point is below the mirrors] permits a substantial reduction in the latching force required to hold the mirrors in alignment between alignment operations.

Receivers, such as photovoltaic cells, convert the solar energy focused and delivered to them by the solar concentrator directly into electrical energy or via heat engines (e.g. Stirling cycle engines) which convert the solar energy into mechanical energy which can be used directly, or indirectly converted to electricity.

There are many aspects and applications of this invention, which provides techniques applicable individually or in combination as an actuator, for motion control, and for positioning of the optical elements of a solar concentrator and similar equipment. One broad general concept of this invention relates to the actuation, motion production and control, and positioning resulting from an "Electric Wind" which herein shall mean the force due to electrons, ions, and neutrals in electric fields. The instant invention can perform dynamic motion control over a wide range of dimensions from nanometers to decimeters, i.e. from the nano-range, through the micro-range, through the mini-range to the macro-range. Another broad general concept of this invention relates to Induced Dipole Alignment for the actuation, motion production and control, and positioning of planar optical elements. Optical elements such as mirrors are normally made of a conductive metallic coating. In an applied electrostatic field, E, a dipole moment is induced in the metallic conducting material of swiveled-mirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. Another way to think of this in equilibrium is that a good conductor cannot long support a voltage difference across it without a current source. Furthermore, an electrostatic field polarizes and aligns any dielectric associated with a mirror. The mirror has a high aspect ratio of diameter to thickness. Similarly the transparent dielectric part of the mirror has a high aspect ratio of diameter to thickness. An induced electrostatic dipole in a swiveled conductor in an electrostatic field is somewhat analogous to an induced magnetic dipole in a swiveled ferromagnetic material in a magnetic field, which effect most people have experienced. When swiveled, a high aspect ratio (length to thickness ratio) ferromagnetic material rotates to align itself parallel to an external magnetic field. Another aspect of the instant invention is that the same alignment technique can be done magnetically with an induced magnetic dipole in mirrors made of ferromagnetic material and/or an attached permanent dipole.

If double back-to-back mirrors are used, an option presents itself to use the better surface as the surface that reflects the light, and furthermore to have a standby mirror in each element should one of the mirrors degrade. A permanent electret dipole can be sandwiched between the two induced dipole mirrors to further enhance the dipole field that interacts with the addressable alignment fields.

Although the primary application of the instant invention is for a solar concentrator application, there are a number of other applications such as mirrored illumination and projection, optical switching, solar propulsion assist, etc.

In the adjustable Fresnel reflectors solar concentrator with induced dipole alignment of swiveled mirrors that has been developed, the induced dipole aligns the optical elements to concentrate solar energy on a receiver having dimensions small compared to the dimensions of the array. This permits the focal point of the array to remain focused on the receiver over the course of a day and throughout the year.

Receivers, such as photovoltaic cells, convert the solar energy focused and delivered to them by the solar concentrator directly into electrical energy or via heat engines (e.g. Stirling cycle engines) which convert the solar energy into mechanical energy which can be used directly, or indirectly converted to electricity.

There are many aspects and applications of this invention, which provides techniques applicable individually or in combination as an actuator, for motion control, and for positioning of the optical elements of a solar concentrator and similar equipment. The broad general concept of this invention relates to motorless actuation, motion production and control, and positioning. The instant invention can perform dynamic motion control over a wide range of dimensions from nanometers to centimeters, i.e. from the nano-range, through the micro-range, through the mini-range to the macro-range in a broad scope of applications in micro-electro-mechanical systems (MEMS) such as a solar concentrator, and in similar equipment such as optical switching to macro-positioning. Motorless linear motion, angular deflection, and continuous rotation are achieved without recourse to magnetic fields thus eliminating the need for coils. Furthermore, the instant invention permits less costly and greater ease of manufacture while providing well-defined motion and position control.

It is a general aspect of this invention to provide a dynamic system for motion control of an optical system.

Another general aspect of this invention is to provide a positioning system of an optical system.

Another general aspect of this invention is provide a natural stable position of the mirrors by locating the swivel above the mirrors.

Another aspect of the instant invention provides a reduction in the latching force required to hold the mirrors in alignment between alignment operations.

Another aspect of this invention is to provide an actuator for an optical system.

Another aspect of this invention is to provide the motive force for an optical system.

Another aspect of the instant invention is to produce motorless motion of the elements of a solar concentrator.

Another aspect of this invention is to cause motorless angular deflection of the elements of a solar concentrator.

An aspect of the invention is to produce motorless continuous rotation of the elements of a solar concentrator.

An aspect of this invention is to produce motorless rotation of the elements of a solar concentrator with the ability for smooth stopping.

Other aspects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

GLOSSARY

The following is a glossary of components and structural members as referenced and employed in the instant invention with like reference alphanumerics indicating like components:

1'—electrons
1—rotatable optical element (includes mirror)
2'—whiskers
2—electret dipole
2—mirror
3'—electrode (that serves as a cathode)
3—negative-end of an induced dipole or an electret dipole
3"—incident light
4'—electric wind grid
4—positive-end of an induced dipole or an electret dipole
4—Fresnel concentrator
5'—region between $V_g$ and V'
5—body of the electret
5—device for additional rotational degree of freedom for mirrors
5t—top of a grid compartment
5b—bottom of a grid compartment
5'—pyramidal concentrator and receiver system
6—edge of optical element (mirror)
6—semi-sphere
6'—Support rod
6"—ultimate anode collector plate electrode
6T—approximate cutoff point for the dielectric induced charge density
6B—approximate cutoff point for the dielectric induced charge density
7—concentrator modules
8—swivel bearing
8'—dielectric (such as glass or plastic)
9—universal swivel that can rotate or tilt in any direction
9'—swivel for rotation
9"—wire
10—indented track (with detent positions)
11—detent positions
14—conducting mirror (highly reflecting metal)
15—conducting mirror (highly reflecting metal)
16'—dielectric (supports two mirrors and its end fits into detent positions)
16—receiver (receives or collects light e.g. solar cell, Stirling cycle heat engine, etc.)
17—dielectric protrusion (fits into detent position)
17'—sheet (contains optical elements within it)
18—lubricating fluid
19—concentric cavity
20—conducting arm (supports mirror and supplies voltage to tip)
21—sharp pointed tips (for field emission and/or air ionization)
22—ancillary conducting arm (enhances rotational torque & supplies voltage to tip)
23—ancillary sharp pointed tips (to enhance rotational torque by emission & ionization)
24'—axis of rotation
24—resistive grid wires
30—reflected light
44—electronic control grid (in perspective)
45—transparent sheet on top of grid
100—Sun
102—concentrator modules (for trough concentrator)
104—trough concentrator
106—enclosure for trough receiver
107—trough receiver (receives or collects light e.g. solar cell, Stirling cycle heat engine, etc.)
E—electric field
d—total dipole moment of induced dipole in mirror and electret dipole
D—total dipole moment of induced dipole in mirror and induced dipole in dielectric
M—induced dipole moment in mirror
V'—ultimate anode collector plate voltage
$V_1$—voltage (to activate tips 21)
$V_2$—voltage (to activate cross arm tips 23)
V1,V2,V3,V4—voltage (number next to V indicates grid voltage location)
Vm1—Voltage on conducting mirror 1
Vm2—Voltage on conducting mirror 2
$V_g$—grid voltage
+—positive charge
−—negative charge

DETAILED DESCRIPTION OF THE PRESENTLY PREFERRED EMBODIMENTS

As is described here in detail, the objectives of the instant invention may be accomplished by any of a number of ways separately or in combination, as taught by the instant invention. A tracking solar concentrator has been developed in which the orientation of individual optical elements (mirrors, reflectors, lenses) is accomplished by electric wind and/or electric dipole interaction between the electric field of a grid and an induced dipole, and/or an electret dipole, to align them consecutively or concurrently without the need for expensive, bulky, and heavy motors. Thus the improved solar concentrator of the instant invention can be less expensive, more reliable, and lighter in weight than conventional solar arrays.

Figure 1A:
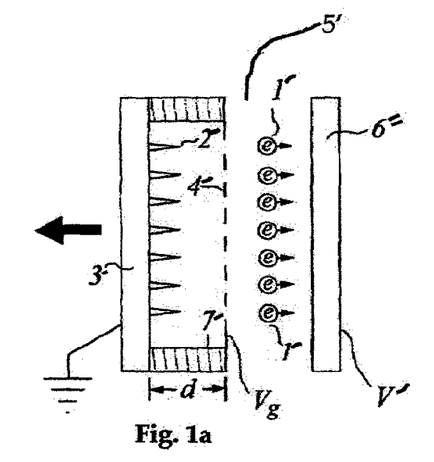
FIG. 1a is a cross-sectional side view of an electric wind motive device for mirror alignment that produces a force by the emission of electrons.

FIG. 1a shows a cross-sectional side view of one embodiment of an electric wind motive device for mirror alignment, which in this case produces a force by the emission of electrons 1' from whiskers 2' on an electrode 3' that serves as cathode. Upon leaving the whiskers 2', the electrons 1' cross the gap d to pass through an electric wind grid 4' at voltage $V_g$ to enter a region 5', and then are collected at the ultimate anode collector plate electrode 6" at voltage $V' \geqq V_g$. When $V'=V_g$, region 5' is field free. A dielectric 7' supports the grid 4' and electrically isolates the grid 4' from the electrode 3'. The configuration of the grid 4' at fixed separation d from the electrode 3' serves to maintain an unchanging macroscopic electric field as motion is imparted to electrode 3'. Otherwise the cathode-anode gap would change, requiring a modulation of the applied voltage to control the motive force. A repulsive force is produced to the left as shown by the arrow. If the device operates in the purely field emission mode, reversing the voltages will stop the emission and there will be no emission force. Thus a spatially reversed similar device is needed for reverse motion to the right; and can also function to produce smooth stopping.

Figure 1B:
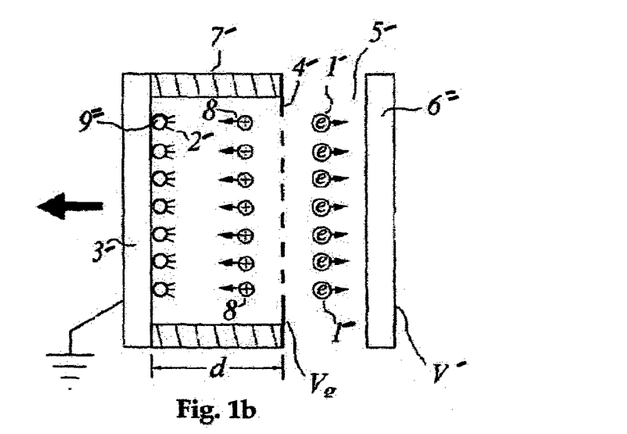
FIG. 1b is a cross-sectional side view of another electric wind motive device for mirror alignment that produces a force by the collection of ions and electrons.

FIG. 1b is a cross-sectional side view of another embodiment of an electric wind motive device for mirror alignment that produces a force to the left, as shown by the arrow, in this case by the collection of electrons 1' and positive ions 8' produced for example by a corona discharge. As an alternate way of introducing whiskers 2 inside the device, wires 9" upon which whiskers are grown (cf. Mario Rabinowitz, Emissive Flat Panel Display with Improved Regenerative Cathode, U.S. Pat. Nos. 5,697,827, 5,764,004, and 5,967,873), are attached to electrode 3'. A dielectric 7 of length d supports the electric wind grid 4' and electrically isolates the grid 4' at voltage $V_g$ from electrode 3'. An ultimate collector plate electrode 6" is at voltage $|V'| \geqq |V_g|$. When $V' = V_g$, region 5' is field free. The configuration of the grid 4' at fixed separation d from electrode 3' serves to maintain an unchanging macroscopic electric field as motion is imparted to electrode 3' due to the force of the ions. With $V_g$ positive, the force is to the left as shown by the arrow. A spatially reversed motive device can be used for reversed motion to the right, such as illustrated in FIG. 1c for motion to the left or right; and can also function to produce smooth stopping.

Figure 1C:
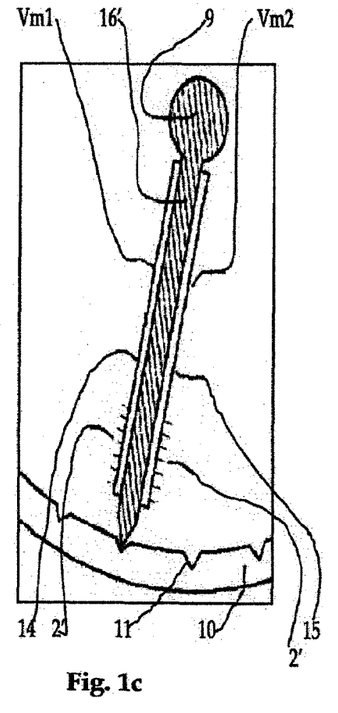
FIG. 1c is a framed in isolation, cross-sectional side view of an angular deflection double mirror device, suspended from a swivel, for motorless alignment, which moves to a given detent position.

FIG. 1c is a framed in isolation, cross-sectional side view of an angular deflection double mirror device, suspended from a swivel 9, which moves to a given detent position. Shown is an indented track 10 which can be attached below the mirrors 14 and 15, with detent positions 11. The application of a voltage Vm1 to conducting mirror 14 and/or Vm2 to conducting arm 15 produces a large microscopic electric field with a high field gradient at the whiskers 2' so that the mirrors can rotate about the swivel point 9 by the Electric Wind mechanisms. Motion in other directions is possible as described in conjunction with FIG. 1e.

The application of a voltage Vm1 to conducting mirror 14 and/or Vm2 to conducting arm 15 produces a large microscopic electric field with a high field gradient at the whiskers 2' so that the device may operate by any of the electric wind physical mechanisms such as field emission, corona discharge, negative ion emission, etc. As shown here, the electric wind motive device can operate without the grid 4', dielectric 7', etc. which are shown in FIGS. 1a and 1b. The main point of FIG. 1c is the illustration of mirror rotational alignment. The mirror surfaces 14 and 15 can be conductors that are separated by a dielectric 16'. Alternatively, thin film conductors can be laid down below (or even above) the mirrors to supply the given voltages, with a minimal blockage of sunlight. Although one mirror 14 is sufficient, the advantage of double back-to-back mirrors 14 and 15 is that when the top mirror becomes occluded with grime, the mirrors 14 and 15 can be rotated 180 degrees about the pivot 13 exposing on top the clean mirror that was previously on the bottom. This roughly doubles the time before cleaning of the mirrors is necessary. It also makes possible an uninterrupted duty cycle of the concentrator, as the grimy occluded mirrors facing downward can be cleaned, while the mirrors on top perform their duty. The mirrors can be flat or slightly concave.

There is a flexible protrusion at the radial end of the dielectric 16 which fits into the detent positions 11. The protrusion can be retracted during the alignment process and spring loaded to engage a detent position 11 after each alignment process is complete. The mirror can remain in alignment with the voltages removed, until a new alignment is desired. Motion in other directions is possible as described in conjunction with FIG. 1e. Only part of the indented track 10 is shown here in FIG. 1c. The indented track 10 is positioned down below the mirrors 14 and 15 so as not to block light. Similarly, the flexible protrusion (that fits into the detent positions) extends below the mirrors 2 to engage the indented track 10 down below the mirrors 14 and 15. The indented track 10 may be somewhat hemispherical.

Figures 1D, 1E:
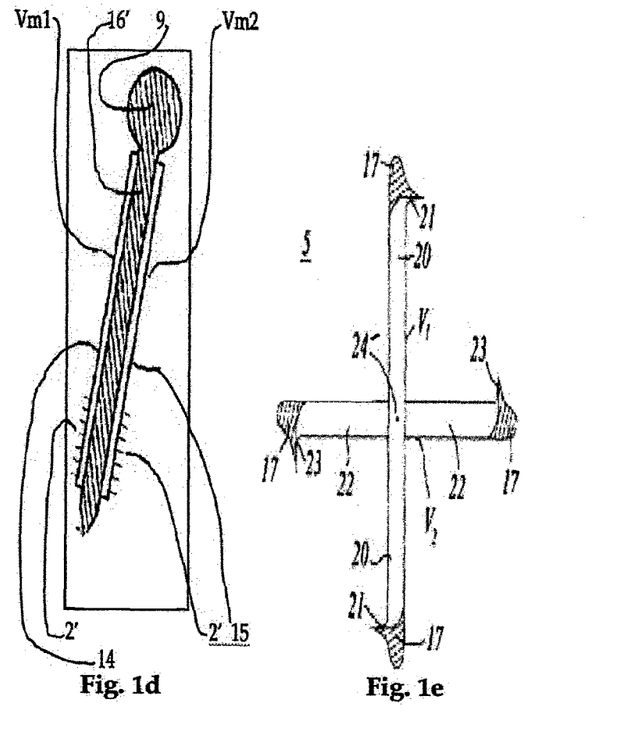
FIG. 1d is a framed in isolation, cross-sectional side view of an angular deflection double mirror device, suspended from a swivel, for motorless alignment.
FIG. 1e is a cross-sectional top view of an ancillary electric wind cross arm for additional rotational degrees of freedom of the mirrors.

FIG. 1d is a framed in isolation, cross-sectional side view of an angular deflection double mirror device, suspended from a swivel, for motorless alignment without a detent track. The application of a voltage Vm1 to conducting mirror 14 and/or Vm2 to conducting arm 15 produces a large microscopic electric field with a high field gradient at the whiskers 2' so that the device may operate by any of the electric wind physical mechanisms such as field emission, corona discharge, negative ion emission, etc. As shown here, the electric wind motive device can operate without the grid 4', dielectric 7', etc. which are shown in FIGS. 1a and 1b. The main point of FIG. 1c is the illustration of mirror rotational alignment. The mirror surfaces 14 and 15 can be conductors that are separated by a dielectric 16'. Alternatively, thin film conductors can be laid down below (or even above) the mirrors to supply the given voltages, with a minimal blockage of sunlight.

Although one mirror 14 is sufficient, the advantage of double back-to-back mirrors 14 and 15 is that when the top mirror becomes occluded with grime, the mirrors 14 and 15 can be rotated 180 degrees about the pivot 13 (by means of the motive force provided by the cross arm described in FIG. 1e) exposing on top the clean mirror that was previously on the bottom. This roughly doubles the time before cleaning of the mirrors is necessary. Motion in other directions is possible as described in conjunction with FIG. 1e. Another advantage of the double back-to-back electric wind production by the activated whiskers 2' is the smooth stopping of the rotation of the mirrors, which would otherwise be difficult with just a unidirectional electric wind force.

FIG. 1e is a cross-sectional top view of an ancillary electric wind cross arm for an additional rotational degree of freedom of the mirrors. The approximate orthogonal spatial orientation to the electric wind device in FIGS. 1c and 1d, provides additional degrees of rotational motion. The application of a voltage $V_1$ to conducting cross arm 20 produces a large microscopic electric field with a high field gradient at the sharp pointed tips 21 so that the device may operate by any of the electric wind physical mechanisms such as field emission, corona discharge, negative ion emission, etc. The resulting torque produces alignment about the axis of rotation 24'. Similarly for an ancillary torque, the application of a voltage $V_2$ to the conducting cross arm 22 produces a large microscopic electric field with a high field gradient at the sharp pointed tips 23 so that the device may operate by any of the electric wind physical mechanisms such as field emission, corona discharge, negative ion emission, etc. The dielectric protrusion 17 is shaped to fit into detent positions in case a detent track is desired. The conducting cross arm 20 can support the mirrors 14 and 15 from either above or below the mirrors. To minimize light occlusion the second cross arm 22 can be attached below the mirrors 14 and 15.

Figure 2A:
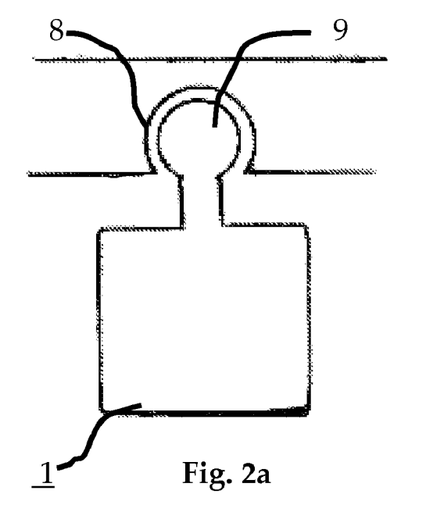
FIG. 2a is a cross-sectional front view of a suspended rectangular mirror that is on an overhead universal swivel as one optical element of an adjustable Fresnel reflector solar concentrator.

FIG. 2a is a front cross-sectional view of an inverted rectangular planar or slightly concave optical element (mirror) 1 suspended from a universal swivel 9 that can rotate or tilt in any direction, supported by a swivel bearing 8. This is one member of an adjustable Fresnel reflector solar concentrator array. The mirror can be flat or slightly concave. The advantage of overhead suspension with the swivel and bearing above the center of mass of each element is that it provides natural vertical stability to said optical elements. Alignment can be achieved by an Electric Wind Force and/or Induced Dipole Force.

Figure 2B:
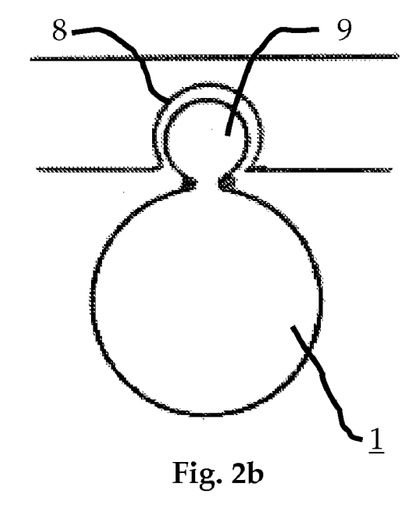
FIG. 2b is a cross-sectional front view of a suspended circular mirror that is on an overhead universal swivel as one optical element of an adjustable Fresnel reflector solar concentrator.

FIG. 2b is a front cross-sectional view of an inverted circular planar or slightly concave optical element (mirror) 1 suspended from a universal swivel 9 that can rotate or tilt in any direction, supported by a swivel bearing 8. This is one member of an adjustable Fresnel reflector solar concentrator array. The mirror can be flat or slightly concave. Alignment can be achieved by an Electric Wind Force and/or Induced Dipole Force.

Figure 2C:
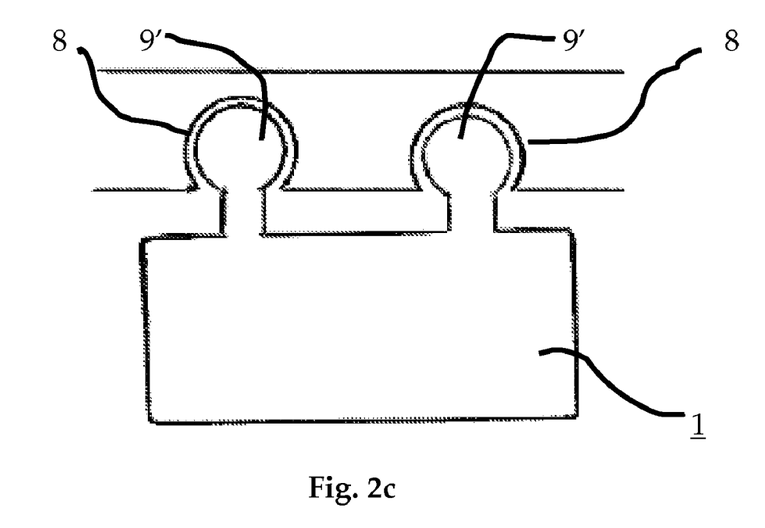
FIG. 2c is a cross-sectional front view of a long rectangular mirror suspended from two overhead swivels, that is one optical element of an adjustable Fresnel reflector solar concentrator.

FIG. 2c is a front cross-sectional view of an inverted long rectangular planar or slightly concave optical element (mirror) 1 suspended from two swivels 9' for rotation or tilting, supported by two swivel bearings 8. This is one member of an adjustable Fresnel reflector solar concentrator array. The mirror can be flat or slightly concave. Alignment can be achieved by an Electric Wind Force and/or Induced Dipole Force.

Figure 2D:
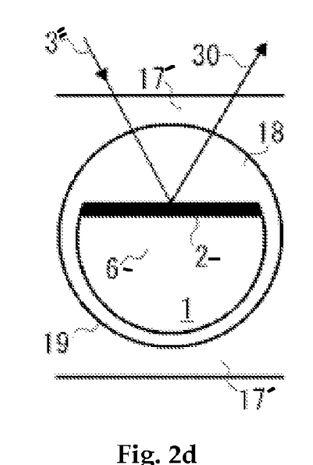
FIG. 2d is a cross-sectional view of a semi-sphere with a mirror on its flat top. This element is encapsulated in a lubricated concentric cavity, and is one of a multitude of optical elements that can track a light source and focus a concentrated light beam onto a receiver.

FIG. 2d is a cross-sectional view of a single rotatable optical element 1 which is a flat top semi-sphere 6- upon which is a mirror 2- with rounded edges. The element 1 can also be semi-spheroidal, and is completely encompassed with a lubricating fluid 18 which is encapsulated inside a concentric cavity 19 in sheet 17'. Also shown is the incident light ray 3'' and the reflected light ray 30.

Figure 2E:
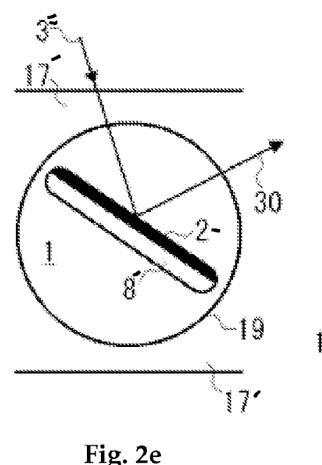
FIG. 2e is a cross-sectional view of a circular disk with a top surface reflecting mirror on a dielectric. This element is encapsulated in a lubricated spheroidal cavity, and is one of a multitude of optical elements that can track a light source and focus a concentrated light beam onto a receiver.

FIG. 2e shows a cross-sectional view of a circular disk rotatable optical element 1 with a circular disk mirror 2- on the top of a dielectric 8', that is completely encompassed with a lubricating fluid 18 which is encapsulated inside a concentric cavity 19 in sheet 17'. The backing dielectric 8' is present to give the mirror 2- rigidity if the mirror is made of a highly reflective thin film such as Aluminum or Chromium. When the dielectric 8' has a high dielectric constant, it helps in the alignment process as explained in conjunction with FIGS. 3a, 3b, and 3c. The backing may also be metallic, though a dielectric backing is preferred because of its lower mass density and lower cost. Also shown is the incident light ray 3 and the reflected light ray 30. Alignment can be achieved by an Electric Wind Force and/or Induced Dipole Force.

Figure 2F:
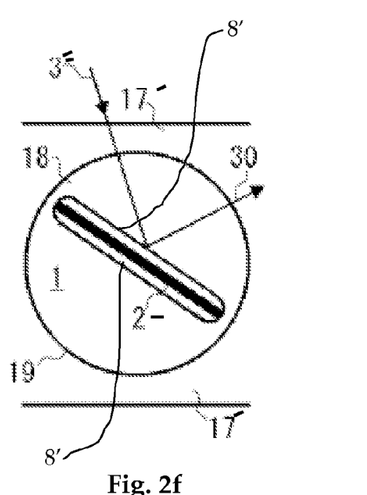
FIG. 2f is a cross-sectional view of a circular disk with an internal reflecting mirror sandwiched between two dielectrics. This element is encapsulated in a lubricated spheroidal cavity, and is one of a multitude of optical elements that can track a light source and focus a concentrated light beam onto a receiver.

FIG. 2f is a cross-sectional view of a circular disk rotatable optical element 1 with an internal reflecting mirror sandwiched between two dielectrics 8' with rounded edges. The element 1 is completely encompassed with a lubricating fluid 18 which is encapsulated inside a concentric cavity 19 in sheet 17'. Also shown is the incident light ray 3'' and the reflected light ray 30. This element is one of a multitude of optical elements that can track a light source and focus a concentrated light beam onto a receiver. Smooth stopping is an advantage naturally built into the operation of all the planar mirror dipole embodiments. The torque is proportional to the vector cross product of the dipole moment, applied electric field E, and sine of the angle between the vector dipole moment and the vector E. Thus the torque automatically goes to zero as a mirror aligns itself with the applied electric field. Alignment can be achieved by an Electric Wind Force and/or Induced Dipole Force.

Figure 2G:
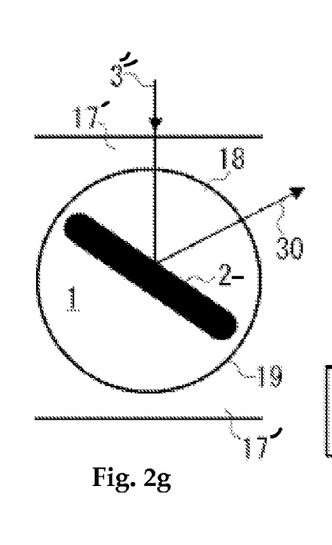
FIG. 2g is a cross-sectional view of a circular metal conducting disk that is a highly reflecting mirror. This element is encapsulated in a lubricated spheroidal cavity, and is one of a multitude of optical elements which can track a light source and focus a concentrated light beam onto a receiver.

FIG. 2g shows a cross-sectional view of a rotatable element 1 that is a circular disk metallic mirror 2- with rounded edges, that is completely encompassed with a lubricating fluid 18 which is encapsulated inside a concentric cavity 19 of sheet 17. Also shown is the incident light ray 3 and the reflected light ray 30. This highly reflecting mirror is one of a multitude of optical elements which can track a light source and focus a concentrated light beam onto a receiver. Alignment can be achieved by an Electric Wind Force and/or Induced Dipole Force.

Figure 2H:
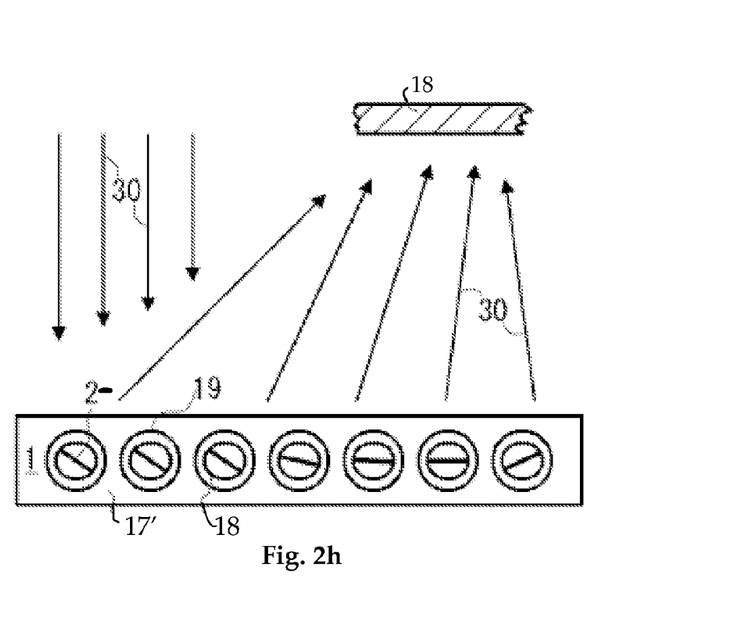
FIG. 2h is a cross-sectional view of an ensemble of micromirrors encapsulated in lubricated cavities in a micro-optics concentrator. These micro-mirrors internal-swivel in rotation so they can focus incident light onto a receiver.

FIG. 2h is a cross-sectional view of a concentrator comprising an ensemble of elements 1 containing micro-mirrors 2- encapsulated in lubricant 18 inside spherical cavities 19 in a sheet 17'. These micro-mirrors 2 are thus rotational with minimal friction, so they can focus incident light with concentrated reflected light 30 onto a receiver 9. Alignment can be achieved by an Electric Wind Force and/or Induced Dipole Force.

Figure 3A:
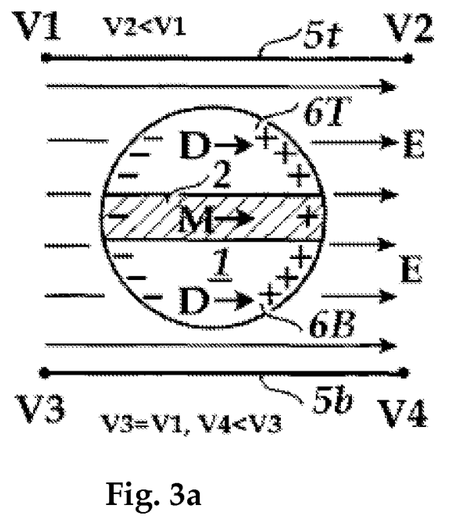
FIG. 3a is a schematic (not showing swivel, etc.) cross-sectional view of a rotatable element (circular mirror) with induced dipole mirror and induced dipole dielectric aligned parallel to partitioned electrodes where an ensemble of such elements are a major constituent of a swiveled-optics concentrator.

FIG. 3a is a schematic (not showing swivel, etc.) cross-sectional view of a rotatable element (circular mirror) 1 in which a dipole moment M can be induced in the metallic part of the mirror together with an induced dipole D in the dielectric part of the mirror when the mirror has both metallic and dielectric components. The alignment shown is parallel to the grid wires. When the mirror is purely metallic, only the dipole moment M is present. An electret dipole 2 can also be present to further augment the total dipole moment. This further enhances the dipole field that interacts with the addressable alignment fields. The induced charge density in the dielectric tapers off perpendicular to the applied field, and 6T and 6B roughly depict the cutoff points for the induced charge density.

Also shown is a top surface of a grid compartment 5t and bottom surface of a grid compartment 5b, where an ensemble of such elements and electrodes are a major constituent of a swiveled-optics concentrator. The grid compartment is delineated by the grid electrodes (cf. FIGS. 4a and 4b). U.S. Pat. No. 6,964,486 by Mario Rabinowitz, "Alignment of Solar Concentrator Micro-Mirrors" issued on Nov. 15, 2005; and U.S. Pat. No. 7,187,490 by Mario Rabinowitz, "Induced Dipole Alignment Of Solar Concentrator Balls" issued on Mar. 6, 2007 describe induced dipole coupling of mirrors and grid for purposes of tracking and focusing alignment.

A processor sends signals via bus bars to establish voltages from a power supply to each corner of a grid compartment (cf. FIGS. 4a and 4b) whose edges are grid electrodes made of a highly resistive thin conductor. At the top of the grid compartment 5t, the left corner is at voltage V1 and the right corner is at voltage V2. For the bottom of grid compartment 5b, the left corner is at voltage V3 and the right corner is at voltage V4 as shown. If a signal sets the voltages so that V3=V1, V4=V2, V2<V1, and V4<V3, this produces an approximately uniform applied electric field E parallel to the grid compartment faces 5t and 5b as shown.

The applied electric field E induces a dipole moment M in the metallic conducting material of the mirrors 2. This is because when a metallic conductor is placed in an electric field, the charge distributes itself so as to produce a field free region inside the conductor. To internally cancel the applied field E, negative − free electrons move to the end of each conducting mirror 2 opposite to the direction of E, leaving positive + charge at the end in the direction of E. The induced dipole moment D in the dielectric results from a similar polarization that tends to cancel the applied field E from the inside of the dielectric. The torque interaction of the induced electric dipole moment of the mirrors 2 and the electric field E acts to align the mirrors 2 parallel to the electric field E as shown here in FIG. 3a. The torque is proportional to the product of E and the net vector dipole moment of M and D and electret dipole 2 which add together to produce a total dipole moment parallel to the mirror 1, and parallel to the applied electric field E. The positive + end and the negative − end align themselves parallel to the electric field E due to the torque interaction of the net electric dipole moment and the applied electric field E, which is proportional to their product (equal to their vector product).

Figure 3B:
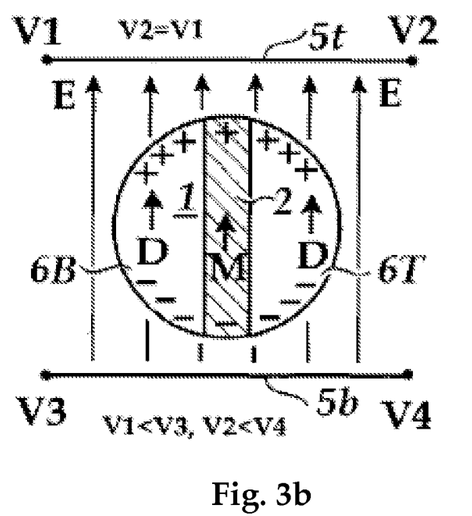
FIG. 3b is a schematic with internal-swivel (or affixed swivel not showing overhead swivel) cross-sectional view of a rotatable element (circular mirror) with induced dipole mirror and induced dipole dielectric aligned perpendicular to partitioned electrodes where an ensemble of such elements are a major constituent of a swiveled-optics concentrator.

FIG. 3b is a schematic (not showing swivel, etc.) cross-sectional view of a rotatable element (circular mirror) 1 in which a dipole moment M can be induced in the metallic part of the mirror together with an induced dipole D in the dielectric part of the mirror when the mirror has both metallic and dielectric components. The alignment shown is perpendicular to the grid wires. When the mirror is purely metallic, only the dipole moment M is present. An electret dipole 2 can also be present to further augment the total dipole moment. This further enhances the dipole field that interacts with the addressable alignment fields. The induced charge density in the dielectric tapers off perpendicular to the applied field, and 6T and 6B roughly depict the cutoff points for the induced charge density. Also shown is a top surface of a grid compartment 5t and bottom surface of a grid compartment 5b, where an ensemble of such elements and electrodes are a major constituent of a swiveled-optics concentrator. The grid compartment is delineated by the grid electrodes (cf. FIGS. 4a and 4b).

A processor sends a signal that sets the voltages so that V2=V1, V1<V3, V2<V4, and V4=V3, this produces an approximately uniform applied electric field E parallel to the grid compartment faces 5t and 5b as shown.

Figure 3C:
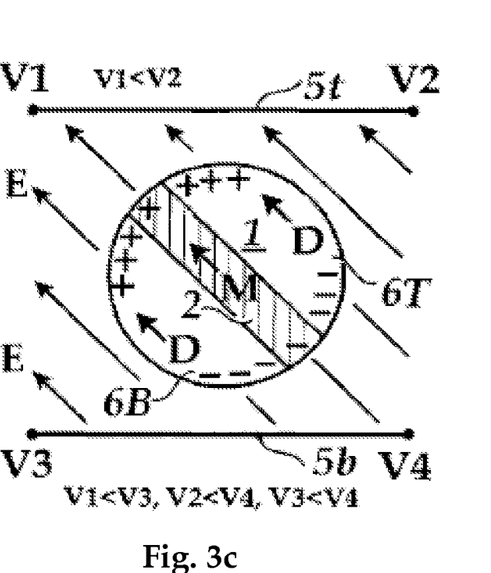
FIG. 3c is a schematic with internal-swivel (or affixed swivel not showing overhead swivel) cross-sectional view of a rotatable element (circular mirror) with induced dipole mirror and induced dipole dielectric aligned at a tilted angle with respect to partitioned electrodes where an ensemble of such elements are a major constituent of a swiveled-optics concentrator.

FIG. 3c is a schematic (not showing swivel, etc.) cross-sectional view of a rotatable element (circular mirror) 1 in which a dipole moment M can be induced in the metallic part of the mirror together with an induced dipole D in the dielectric part of the mirror when the mirror has both metallic and dielectric components. The alignment shown is at a tilted angle with respect to the grid wires. When the mirror is purely metallic, only the dipole moment M is present. An electret dipole 2 can also be present to further augment the total dipole moment. This further enhances the dipole field that interacts with the addressable alignment fields. The induced charge density in the dielectric tapers off perpendicular to the applied field, and 6T and 6B roughly depict the cutoff points for the induced charge density. Also shown is a top surface of a grid compartment 5t and bottom surface of a grid compartment 5b, where an ensemble of such elements and electrodes are a major constituent of a swiveled-optics concentrator. The grid compartment is delineated by the grid electrodes (cf. FIGS. 4a and 4b).

A processor sends a signal that sets the voltages so that V1<V2, V1<V3, V2<V4, and V3<V4. This produces an approximately uniform applied electric field E tilted with respect to the grid compartment faces 5t and 5b as shown.

Figure 3D:
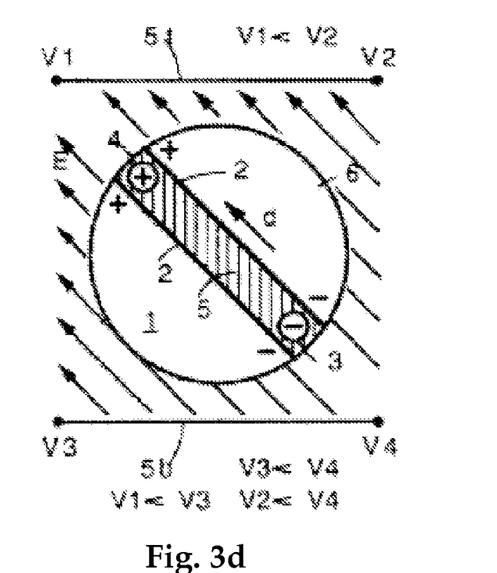
FIG. 3d is a schematic with internal-swivel (or affixed swivel not showing overhead swivel) cross-sectional view of a rotatable element (circular mirror) with an electret dipole sandwiched between induced dipole mirrors aligned at a tilted angle with respect to partitioned electrodes where an ensemble of such elements are a major constituent of a swiveled-optics concentrator.

FIG. 3d is a schematic (not showing swivel, etc.) cross-sectional view of a rotatable element (circular mirror) 1 with an optional electret dipole 2 and induced dipole d in the mirror which causes alignment at a tilted angle with respect to partitioned top grid electrode 5t and bottom grid electrode 5b, where an ensemble of such elements are a major constituent of a swiveled-optics concentrator.

For the top of grid compartment 5t, the left corner is at voltage V1 and the right corner is at voltage V2. For the bottom of a grid compartment 5b, the left corner is at voltage V3 and the right corner is at voltage V4. A signal sets the voltages so that V1<V2, V2<V4, V1<V3, and V2<V4, producing an approximately uniform applied electric field E that is tilted with respect to the grid electrodes 5t and 5b as shown. The mirror 1 aligns itself parallel to the electric field E due to the induced dipole field polarization of the mirror, and permanent dipole of the electret 5. Two-axis tracking is possible by additional alignment of the mirrors 1 out of the plane of the paper. This is accomplished by similar voltage relationships to those already described as can be understood from the top and bottom electrode views shown in FIGS. 4a and 4b.

The optional electret 2 can be used to augment the torque. In equilibrium i.e. when the rotation is complete, the polarization due to the electret 5 and that due to the induced charges of the conducting mirrors 1 add together as vectors to produce a total dipole moment d parallel to the mirror 1, and parallel to the applied electric field E. The positive + end 4 and the negative − end 3 of the electret 2 align themselves parallel to the electric field E due to the interaction of the permanent electric dipole moment d of the electret 2 and the applied electric field E, which is proportional to their vector product. Since the body of the electret 5 and its dipole moment d are parallel to the mirrors 1, this torque interaction aligns the mirrors 1 parallel to the applied electric field E.

The presence of the optional electret 5, enhances the torque. In the absence of the electret 5, the dipole moment induced in the mirrors 1 can be sufficient to produce alignment. However, the additional torque provided by the electret 5 helps to overcome frictional effects.

An magnetic interaction that is analogous to the electrostatic interaction can also be used. A magnet can replace the electret, a shiny ferromagnetic material can function as a mirror to replace the conducting mirror material, and an applied magnetic field can replace the applied electrostatic field. The torque would then result from the vector product of the total magnetic dipole and the magnetic field.

Figure 4A:
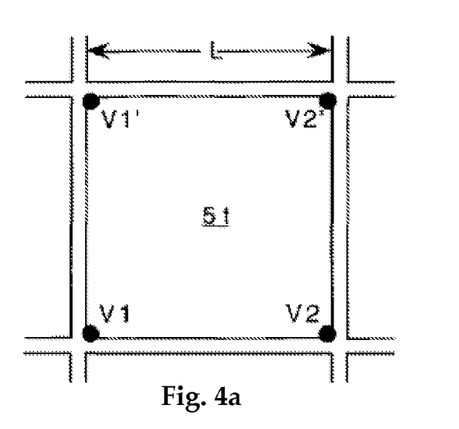
FIG. 4a is a schematic top view of an array of partitioned highly resistive electrodes showing in detail a top electrode of an electronic control grid for rotating the reflecting elements of a solar concentrator or other similar optical equipment. (This schematic can represent either passive or active addressing as will be explained in the detailed description of FIG. 4c).

FIG. 4a represents a top view of an array of grid compartments with grid spacing L showing in detail a top view of one such top grid compartment 5t and the voltages at its four corners V1, V2, V1' and V2'. Voltages V1 and V2 correspond to voltages V1 and V2 shown in the cross sectional FIGS. 3a, 3b, 3c, and 3d. Voltages V1' and V2' are the voltages at the corners of this top of grid compartment 5t below the plane of the paper. Each grid electrode is made of a highly resistive thin conductor which hardly occludes light.

Figure 4B:
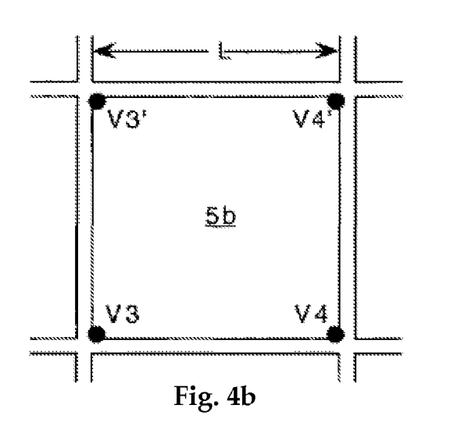
FIG. 4b represents a bottom view of an array of partitioned highly resistive electrodes showing in detail a view of a bottom electrode and the voltages at its four corners.

FIG. 4b represents a bottom view of an array of grid compartments delineated by highly resistive electrodes with grid spacing L showing in detail a view of a bottom electrode 5b and the voltages at its four corners V3, V4, V3' and V4'. Voltages V3 and V4 correspond to voltages V3 and V4 shown in the cross sectional FIGS. 3a, 3b, 3c, and 3d. Voltages V3' and V4' are the voltages at the corners of this bottom electrode 5b below the plane of the paper.

Figure 4C:
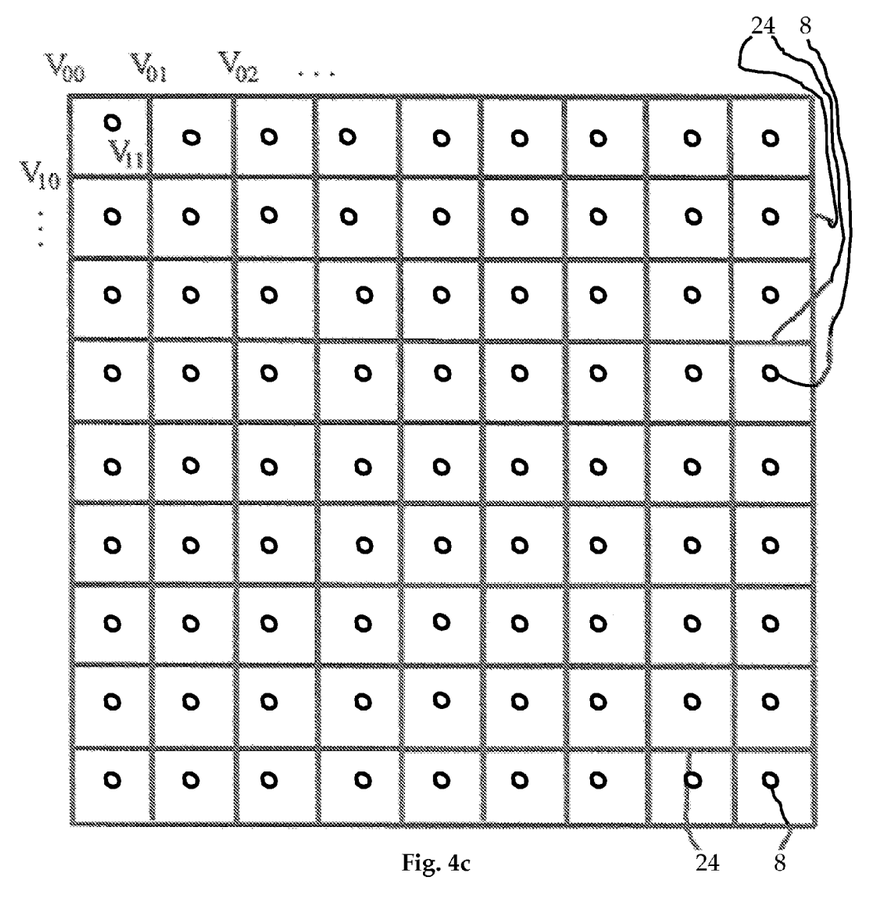
FIG. 4c is a schematic top view showing a generic electronic control grid that may represent a number of different kinds of transistorless grids; or grids with transistors at junctions, for matrix addressing and alignment of the optical elements of a solar concentrator or other similar optical equipment. Also shown schematically are the swivel bearings of the transparent material that supports the mirrors and the grid.

FIG. 4c is a schematic top view showing an electronic control grid with resistive grid wires 24 for either passive or active addressing matrix addressing and alignment of the optical elements of a solar concentrator or other similar optical equipment. Also shown schematically are the swivel bearings 8 which support the swivels (described earlier with swivels designated as 9). The term "equipment" is used in the instant invention to stand for Solar Energy Concentrators which may be of the Fresnel reflector type, or other types of equipment requiring addressing and alignment, such as optical switches and display equipment. This grid can be laid on the bottom of the equipment, on the top and bottom of the equipment, on the top of the equipment with a ground plane on the bottom of the equipment, etc. In order to avoid having several similar looking figures, this schematic may be thought of as a representation of any one of several addressing grid arrays. It can be a passive matrix wire grid array with one set of parallel wires on top of the equipment, separated and insulated from an orthogonal set of wires (that are parallel to each other) on the bottom of of the equipment. Alternatively it can be an actual interconnected active matrix grid with Thin Film Transistors (TFTs), tunneling junction transistors (as used in flash memories), or similar devices at each of the grid junctions. In this case it is preferable to use Polymer based transistors for flexibility. The grid may be a segmented array with each square being a separate insulated slab (cf. to U.S. Pat. No. 6,964,486). In this case, the horizontal and vertical lines shown in this figure represent insulation between adjacent segments or slabs. The common element of all of these embodiments is the ability to impress the voltage $V_{ij}$ at the ij th node either statically or by means of a traveling wave. To minimize power dissipation, it is desirable to make the grid electrodes (edges) that delineate the grid compartments such as 5t and 5b of FIGS. 3a, 3b, 3c, and 3d highly resistive so that a given voltage drop is accomplished with a minimum of current flow and hence with a minimum of power dissipation. The bus bars that bring the voltage to the grid electrodes may have a higher conductivity (lower resistance).

Figure 4D:
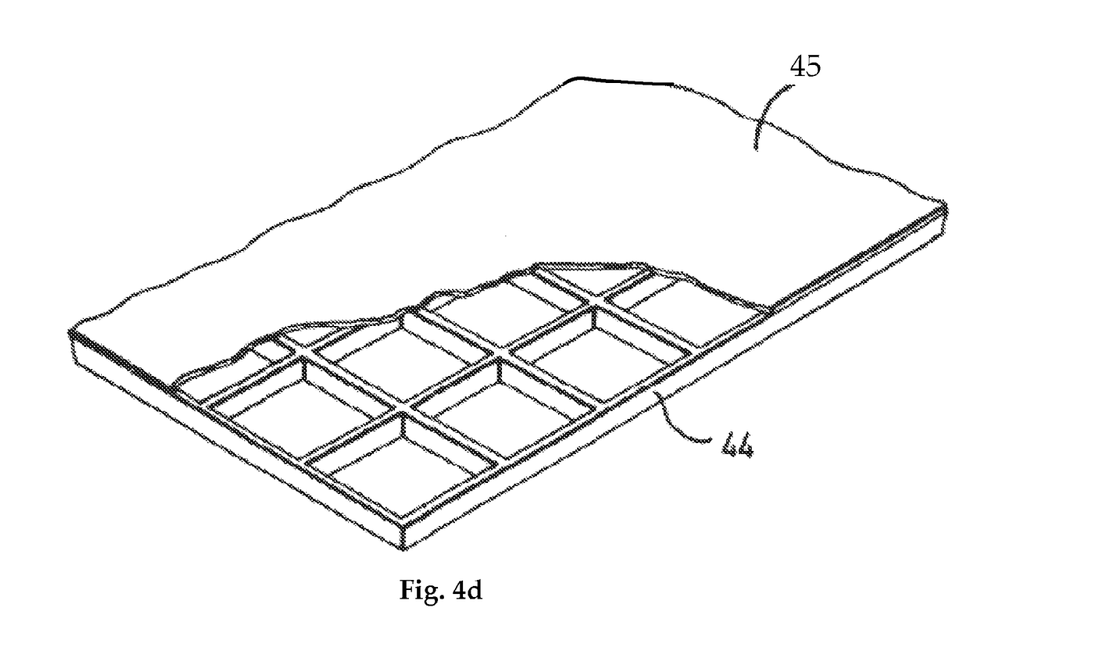
FIG. 4d is a cut-away perspective of a schematic control grid showing a transparent sheet on top of the grid.

FIG. 4d is a cut-away perspective of a schematic electronic control grid 44 showing a transparent sheet 45 on top of the grid 44. The sheet 45 performs at least three functions. The primary function of the transparent sheet 45 is to house the swivel bearings 8 shown in FIGS. 2a, 2b, and 2c, which in turn support the universal swivels 9. The bearings 8 and swivels 9 are not shown in this FIG. 4d to keep this figure uncluttered in showing just the voltage carrying electronic grid 44, and the transparent sheet 45; and because this configuration also applies to the internal-swivel embodiments. The sheet 45 also protects the optical elements (mirrors), and permits an uninterrupted duty cycle of the concentrator, as the grimy, formerly fully transparent sheet can be cleaned, while the mirrors continue to perform their duty. The sheet 45 also functions to seal in a fluid such as vacuum, oil, elevated pressure gas, etc. to increase the dielectric strength (breakdown voltage) of the grid/optical element ensemble. This is explained in the *McGraw-Hill Encyclopedia of Science & Technology*, article on Electrical Insulation by Mario Rabinowitz in any of the editions from 1982-20002.

Figure 5A:
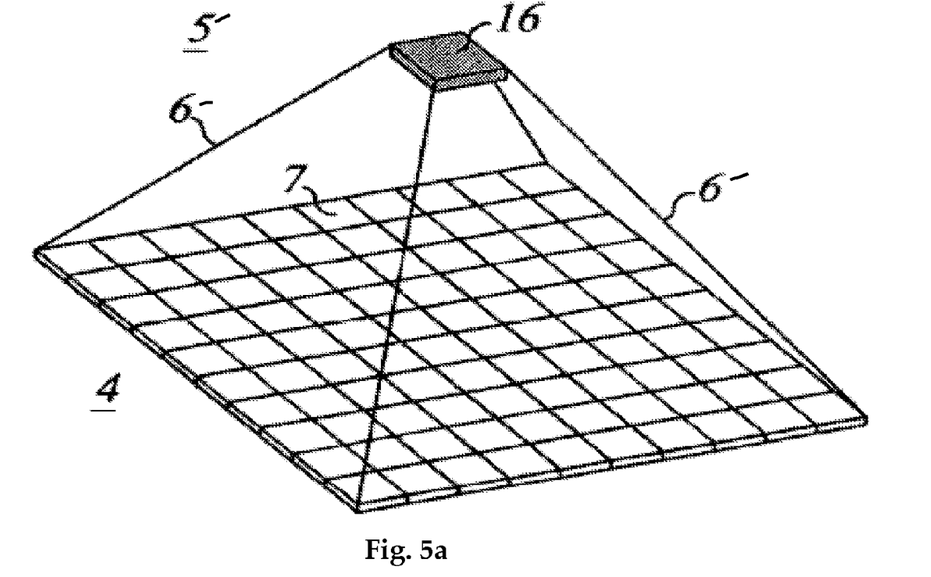
FIG. 5a is a perspective illustration of a Fresnel pyramidal three-dimensional parabolic solar concentrator array that tracks the sun and focuses sunlight onto a receiver.

FIG. 5a is a perspective view of a pyramidal configuration solar collection system 5' consisting of a Fresnel reflector concentrator 4 and receiver 16 above it, supported by rods 6'. When the receiver 16 is a solar photovoltaic receiver, the rods 16 can serve as conduits for electrical wiring to and from the receiver 16. The Fresnel reflector concentrator 4 may be a single large monolitic configuration, or as shown, it is preferably made up of separate modules 7 which are fastened together and secured to an existing surface such as the ground. This facilitates maintenance and repair operations when needed. Thus it is only necessary to remove one or more modules that need to be worked on, rather than disabling the entire concentrator 4. The ensemble of mirrors and confining sheets may be replaced, while retaining the addressing electronics system. Furthermore this modular design also allows the concentrator 4 to be built up easily to increase the concentration factor. Another advantage of this modular design is that the separate modules 7 can be much more easily transported from the factory to the installation site, than would a large monolithic concentrator.

The pyramidal configuration solar collection system 5' can be scaled from micro size to macro size. The limit on smallness (e.g. millimeters) is determined by the smallness of the optical elements (mirrors), with a correspondingly small receiver 16. Small units may be operated together as a system. The macro limit may be in the hundreds meters with structural and economic limits determining the maximum size of a given large unit. For practicality of an overall large system, many modular medium sized units would be preferable.

The concentrator 4 may be secured to the ground or any existing structure such as a roof, side of a building, etc. It is desirable to give the solar collection system 5' a small incline for a number of reasons including gravitational removal of water that may collect on it. This can be done on both flat and inclined roof tops without the growth of vegetation under it. However on the ground, it is preferable to have the system 5' immediately adjacent to the ground to prevent growth of vegetation under it. This can be accomplished by grading of the ground slope prior to installation of the solar collection system 5'.

The pyramidal solar collection system 5' is a preferred embodiment when the concentration factor is roughly >10× and substantial forces of nature such as storms and earthquakes may be encountered. The receiver 16 is perched approximately above the center of the concentrator, with the rods making a roughly 45 degree angle with respect to the concentrator. This is an approximately desirable position and angle, but not critical.

Figure 5B:
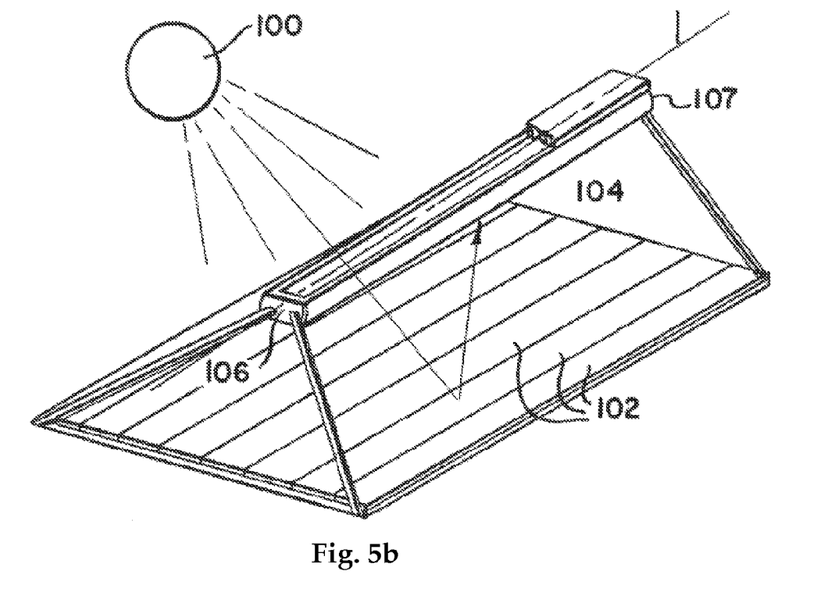
FIG. 5b is a perspective illustration of a Fresnel two-dimensional parabolic trough solar concentrator array that tracks the sun and focuses sunlight onto a receiver.

FIG. 5b is a perspective illustration of a Fresnel two-dimensional parabolic trough solar concentrator and receiver system consisting of Fresnel reflector concentrator modules 102 and receiver 107 above them, for concentrating light from the Sun 100 to the receiver 107 with enclosure 106. The Fresnel reflector concentrator 104 may be a single large monolithic configuration, or as shown, it is preferably made up of separate modules 102 which are fastened together and secured to an existing surface such as the ground. This facilitates maintenance and repair operations when needed. Thus it is only necessary to remove one or more modules that need to be worked on, rather than disabling the entire concentrator 4. The modules can contain mirrors such as illustrated in FIG. 2c. The ensemble of mirrors and confining sheets may be replaced, while retaining the addressing electronics system. Furthermore this modular design also allows the concentrator 104 to be built up easily to increase the concentration factor. Another advantage of this modular design is that the separate modules 102 can be much more easily transported from the factory to the installation site, than would a large monolithic concentrator. It is desirable to give the concentrator 104 a small incline for a number of reasons including gravitational removal of water that may collect on it. On the ground, it is preferable to have the concentrator 104 immediately adjacent to the ground to prevent growth of vegetation under it. This can be accomplished by grading of the ground slope prior to its installation.

The trough configuration solar collection system can be scaled from micro size to macro size. The limit on smallness (e.g. millimeters) is determined by the smallness of the optical elements (mirrors), with a correspondingly small receiver 107. Small units may be operated together as a system. The macro limit may be in the hundreds meters with structural and economic limits determining the maximum size of a given large unit. For practicality of an overall large system, many modular medium sized units would be preferable.

SCOPE OF THE INVENTION

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents. It is to be understood that in said claims, ingredients recited in the singular are intended to include compatible combinations of such ingredients wherever the sense permits. It should be recognized that the methods and apparatus of this invention can be used in other contexts than those explicitly described herein. It is also to be understood that the following claims are intended to cover all of the generic and specific features of the invention herein described, and all statements of the scope of the invention which, as a matter of language, might be said to fall there between.

The invention claimed is:

1. A solar concentrator system comprising
   a) an array of adjustable Fresnel micro-mirrors in the size range nanometers to centimenters;
   b) each of said micro-mirrors suspended from at least one overhead universal swivel structure rotatable in at least two directions;
   c) each said swivel structure supported by a bearing above the center of mass of each micro-mirror;

d) said overhead swivel structure providing natural vertical stability to said micro-mirrors;
e) said micro-mirrors coupled to electric wind motive devices;
f) said devices producing a propelling force;
g) said force producing an alignment of said micro-mirrors to track and focus sunlight onto a receiver;
h) said electric wind force created by emission from said electric wind devices by at least one of the group consisting of electrons, negative ions, positive ions, and polarizable neutrals;
i) said electric wind force controlled by a digital processor; and
j) a receiver for energy conversion of the concentrated light.

2. The apparatus of claim 1, wherein at least one detent positioning track holds said micro-mirrors in fixed aligned position following alignment.

3. The apparatus of claim 1, wherein at least a second electric wind device in approximate orthogonal spatial orientation to said first electric wind device provides additional degrees of rotational motion.

4. The apparatus of claim 1, wherein the ensemble of said micro-mirrors is covered by a transparent sheet.

5. The apparatus of claim 1, wherein said micro-mirrors are contained in a fluid consisting of at least one of the group of vacuum, and elevated pressure gas.

6. The apparatus of claim 1, wherein at least one of said micro-mirrors is a disk.

7. The apparatus of claim 1, wherein at least one of said micro-mirrors is semi-spheroidal.

8. A method of concentrating light comprising the steps of
a) placing an array of micro-mirrors in the size range nanometers to centimenters in the form of a Fresnel reflector in a concentrator array;
b) said micro-mirrors being rotatable in at least two directions;
c) suspending each of said micro-mirrors below at least one overhead universal swivel rotatable in at least two directions above the center of mass of each micro-mirror;
d) supporting each said swivel structure by a bearing above the center of mass of each micro-mirror;
e) providing natural vertical stability to said micro-mirrors by means of said overhead swivel structure;
f) dipole coupling said micro-mirrors to an electronic control grid;
g) activating said control grid by a processor;
h) linking said dipoles to said grid;
i) producing a rotational torque by means of such linkage;
j) aligning said micro-mirrors to track and focus sunlight onto a receiver by means of said torque; and
k) receiving said light.

9. The method of claim 8, wherein said dipole coupling consists of at least one of the group of induced dipole and permanent dipole.

10. The method of claim 8, wherein said dipoles are electric dipoles.

11. The method of claim 8, wherein said dipoles are magnetic dipoles.

12. The method of claim 8, wherein said micro-mirrors are planar.

13. An optical concentrator system comprising
a) an array of adjustable micro-mirrors in the size range nanometers to centimenters; containing a dipole coupling device;
b) each of said micro-mirrors suspended from at least one overhead universal swivel structure that is rotatable in at least two directions;
c) each said swivel structure supported by a bearing above the center of mass of each micro-mirror;
d) said dipole device actuated by a control grid to produce a propelling force; and
i) said propelling force producing an alignment of said optical elements to focus light onto a receiver.

14. The apparatus of claim 13, wherein said dipole is at least one of the group permanent dipole, induced dipole, electric dipole, and magnetic dipole.

15. The apparatus of claim 13, wherein said control grid provides non-mechanical linkage to said micro-mirrors.

16. The apparatus of claim 13, wherein at least one detent positioning track holds said micro-mirrors in fixed aligned position following said alignment.

17. The apparatus of claim 13, wherein the ensemble of said micro-mirrors is covered by a transparent sheet.

18. The apparatus of claim 13, wherein at least one of said micro-mirrors is a mirrored disk.

* * * * *